Patented Jan. 1, 1946

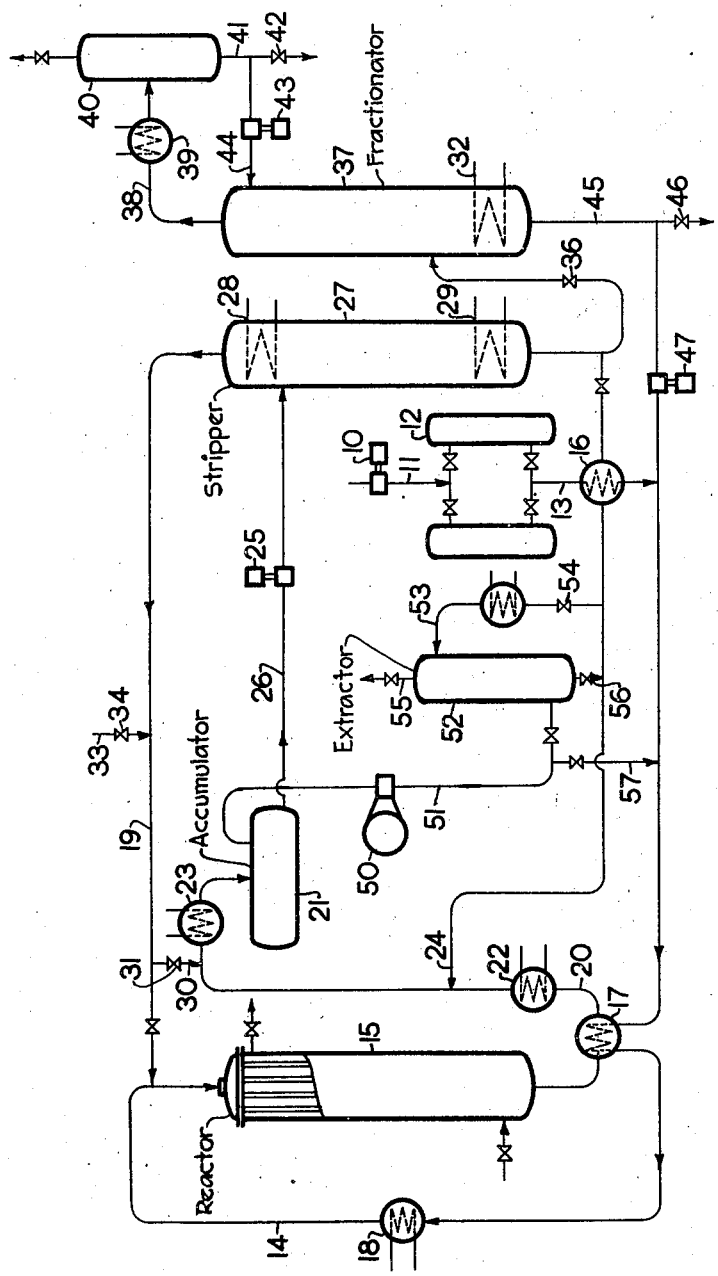

2,392,284

UNITED STATES PATENT OFFICE 2,392,284

CATALYTIC CONVERSIONS

William P. Gage, San Anselmo, Calif., assignor to Shell Development Company, San Francisco, Calif., a corporation of Delaware Original application September 20, 1941, Serial No. 411,687. Divided and this application July 24, 1944, Serial No. 546,257

13 Claims. (Cl. 260—683.5)

This invention relates to the execution of catalytic hydrocarbon conversions with the aid of normally gaseous promoters. A particular aspect of the invention relates to the catalytic isomerization of hydrocarbons with the aid of hydrogen halide promoters.

The effectiveness of the catalysts employed in many catalytic hydrocarbon conversion processes is often greatly enhanced by the presence of certain added normally gaseous materials. Thus, the ability of the Friedel-Crafts type catalysts, for example, the aluminum halides, to catalyze certain hydrocarbon reactions, such as isomerization, is greatly improved by the presence of a hydrogen halide promoter. Often the presence of the normally gaseous promoter is essential to the attainment of yields or conditions of operation which make large-scale operation of the process economically feasible. The use of a normally gaseous promoter involves added operative steps such as, for example, the separation of the promoter from the reaction products, its return to the reaction zone, etc., and the manner in which these steps are executed influences markedly the efficiency of the process. Another vital factor in these processes is the cost of the promoter. The normally gaseous promoters must generally be used in the anhydrous form, and since they often are not readily available in large quantities in this form, or, when available, are generally relatively costly, it is essential to efficient operation of the process that they be recovered substantially completely with a minimum of operative steps from gaseous materials eliminated from the system.

It is an object of the present invention to provide an improved process for the execution of catalytic hydrocarbon conversions with the aid of normally gaseous promoters. A further object of the invention is the provision of an improved process whereby hydrocarbons can be catalytically isomerized in the presence of hydrogen halide promoters with substantially increased efficiency.

In accordance with the process of the invention, reactants comprising, for example, a hydrocarbon to be converted and an added hydrogen halide are contacted at conversion conditions with a suitable catalyst in a reaction zone. A liquid hydrocarbon fraction, preferably obtained within the system, is added to the products leaving the reaction zone. The resulting mixed stream is cooled and passed into an accumulating zone. The amount of liquid hydrocarbons thus added to the products leaving the reaction zone and the degree to which the resulting mixed stream is further cooled are controlled to effect the condensation of vaporized reaction products and, also, the dissolving of substantially all of the hydrogen halide present. A liquid stream comprising hydrocarbon reaction products containing dissolved hydrogen halide is passed from the accumulating zone to a fractionating zone wherein a gaseous fraction comprising the hydrogen halide promoter is separated and recycled to the reaction zone. The part of the normally gaseous fraction in excess of that immediately required in the reaction zone is introduced into the mixed stream of reaction products and added liquid hydrocarbon fraction passing into the accumulating zone. Fixed gases accumulating within the system and unavoidably including a certain amount of the gaseous promoter are removed from the accumulating zone and scrubbed with the liquid hydrocarbon fraction which is to be added to the effluence of the reaction zone.

The process of the invention is applicable to a wide variety of processes wherein catalytic conversions, particularly hydrocarbon conversions, are executed with the aid of normally gaseous promoters. However, for the purpose of simplicity in setting forth more fully the nature of the invention, it will be described in detail hereinafter in its application to the isomerization of hydrocarbons with the aid of an aluminum halide catalyst in the presence of a hydrogen halide promoter. The invention will be more clearly understood from the following detailed description thereof, read in connection with the accompanying drawing, which forms a part of this disclosure, and in which the single figure is a more or less diagrammatic elevational view of a form of apparatus suitable for executing the process of the invention.

Referring to the drawing, an isomerizable hydrocarbon such as, for example, normal butane, is drawn from an outside source and forced by means of pump 10 through line 11 into a drying zone. The drying zone may consist of a plurality of chambers 12 containing a suitable dehydrating agent such as, for example, alumina, calcium chloride, or the like. From driers 12, the dried stream is passed through lines 13 and 14, into a reaction zone. The reaction zone may comprise, for example, an enlarged reaction chamber and/or a plurality of reaction tubes. In the apparatus shown in the drawing, the reactor 15 comprises a plurality of tubes positioned in a vessel enabling the maintenance of a heating or cooling fluid in direct contact with the external surface of the tubes. Suitable header arrangements are comprised within the vessel permitting the passage of fluid reactants in parallel flow through the plurality of reaction tubes. Although but one such reactor is shown in the drawing, a greater number, connected in series and/or in parallel, may be used.

An isomerization catalyst, for example an aluminum halide on a suitable support material, such as anhydrous AlCl₃ on an adsorptive alumina, is placed in the tubes of reactor 15.

The butane charge is preheated, for example by indirect heat exchange with hot products of the system by means of heat exchangers 16 and 17, and brought to the desired reaction temperature by means of a heater 18. Heater 18 may consist of a suitable indirect heat exchanger or any conventional fluid heating means.

A suitable gaseous promoter, for example, a hydrogen halide such as hydrogen chloride, obtained from an outside source, or recycled from within the system as described more fully below, is passed through line 19 into line 14. The amount of hydrogen chloride introduced into the system may vary in accordance with the nature of the charge, catalyst composition, and operating conditions. Thus, in the isomerization of butane, the amount of hydrogen chloride introduced into the system may range from about 0.3% to about 10% of the butane charge and even higher if desired.

The conditions of temperature and pressure maintained in the reaction zone may vary widely with the nature of the charge and the particular catalyst used. Thus, in the vapor phase isomerization of butane, a temperature in the approximate range of, for example, 50° C. to 200° C., preferably in the approximate range of 90° C. to 150° C., may be used. The operation may be executed at any pressure at which butane may be maintained in the vapor phase, for example in the approximate range of from 50 to 500 pounds.

Within reactor 15, the conversion of butane to isobutane is effected. Products comprising isobutane, unconverted butane, and hydrogen chloride are withdrawn from reactor 15 and passed through line 20 to an accumulator 21. In passing through line 20, the reaction products are cooled by indirect heat exchange with the charge in indirect heat exchanger 17 and by passage through suitable coolers 22 and 23. When, under the pressure conditions usually employed, the products from the reaction zone are cooled just sufficiently to condense the butanes contained therein, at least a substantial part of the normally gaseous promoter will remain in the gaseous phase. Separate flows of gaseous and liquid materials must then be passed from accumulator 21 to the fractionating system of the process. The use of cooling temperatures sufficiently low and/or pressures sufficiently high to bring about the solution of at least a substantial part of the hydrogen chloride in the amount of hydrocarbons normally obtained from the reaction zone, to thereby enable the passage of but a single stream of materials from accumulator 21 to the fractionating system, although within the scope of the present invention, is not always economically desirable. In one form of carrying out the process of the invention, solution of substantially all of the hydrogen chloride in the liquid within accumulator 21 is made possible at more moderate conditions of temperature and pressure by the addition of a liquid hydrocarbon fraction to the products from the reactor 15. The liquid hydrocarbon fraction admixed with the products leaving the reactor 15 is preferably obtained within the system of the process. Thus, a cooled liquid butane fraction, separated from the reaction products within the system as described more fully below, is introduced through line 24 into line 20. The amount of the butane fraction so introduced into line 20 and the extent of cooling effected in coolers 22 and 23 are controlled to effect not only the condensation of butane vapors prior to entry of the stream into accumulator 21, but to bring about the solution of substantially all of the hydrogen chloride present in line 20. The amount of cooling required will vary with variations in operating conditions and notably with variations in the amount of hydrogen chloride entering line 20. When the hydrogen chloride content of the mixture in accumulator 21, consisting essentially of butanes and hydrogen chloride, amounts to, for example, about 5.5 mol per cent, a temperature of approximately 40° C., and a pressure of about 140 pounds have been found suitable to permit solution of substantially all of the hydrogen chloride.

Liquid comprising butanes and dissolved hydrogen chloride is withdrawn from accumulator 21 and forced by means of pump 25 through line 26 into a stripping column 27. Within stripping column 27, a gaseous fraction comprising hydrogen chloride is separated from a liquid fraction comprising butanes. Cooling means such as, for example, a closed cooling coil 28 is positioned in the upper part of the column 27 and heating means such as, for example, a reboiler or a closed heating coil 29 is positioned in the lower part thereof to aid in effecting the desired separation. A high pressure, for example in excess of about 300 pounds, may be maintained within stripping column 27. The gaseous fraction is withdrawn overhead from stripper 27 and passed through line 19 to the reactor 15.

Generally the amount of hydrogen chloride introduced into the reaction zone will fluctuate throughout the operation. Therefore, the amount of hydrogen chloride liberated by stripping column 27 often will exceed that immediately required by reactor 15. These fluctuations are, however, generally not so great as to justify the added expense of piping, compression, hydrogen chloride loss, and risk of contaminating the hydrogen chloride entailed in passing and temporarily maintaining this excess in separate gas storage means. In the process of the invention, the amount of hydrogen chloride flowing through line 19 in excess of that immediately required by the reactor 15 is passed therefrom through line 30, controlled by valve 31, into line 20; the amount of promoter in excess of that immediately required thus being dissolved in the butane stream entering accumulator 21. It is seen that accumulator 21 functions as a storage means within the system for the hydrogen chloride in excess of that immediately needed by the reactor 15.

Hydrogen chloride may be introduced into the system as required from an outside source through line 33, controlled by valve 34.

Liquid comprising normal- and isobutane is withdrawn from the lower part of stripping column 27 and passed through line 35, controlled by valve 36, into fractionator 37. A controlled amount of the liquid flowing through line 35 is passed through valved line 24, wherein it is cooled by passage through heat exchanger 16, into line 20, for the purpose described above. Within fractionator 37, a vapor fraction comprising isobutane is separated from a liquid fraction comprising normal butane. The vapor fraction is withdrawn from the top of fractionator 37 and passed through line 38 and cooler 39, into accumulator 40. Liquid comprising isobutane is withdrawn from accumulator 40 through line 41, controlled by valve 42, as the final product. A part of the liquid withdrawn from accumulator 40 is forced by means of pump 43 through line 44 as reflux to the top of fractionator 37. Liquid comprising normal butane is withdrawn from the lower part of fractionator 37 through line 45, controlled by valve 46, and eliminated from the system. At least a part of the normal butane withdrawn from fractionator 37 is forced by means of pump 47 into line 14. A heating means such as, for example, a reboiler or closed heating coil 32 is placed in the lower part of fractionator 37 to aid in the desired fractionation therein.

During the course of the operation, a certain amount of normally gaseous material comprising, for example, hydrogen, will accumulate in the system as a result of undesired side reactions and must be removed in part or in its entirety from the system. This gas will comprise a considerable amount of the anhydrous hydrogen chloride promoter, loss of which would seriously affect the economy of a large-scale process. In the process of the invention this hydrogen chloride is recovered from the gas efficiently, and at little extra cost, within the system of the process. This is accomplished by continuously or periodically withdrawing gaseous material from accumulator 21 and forcing it with the aid of compressor 50 through line 51, into the lower part of an absorber 52. A part or all of the butane stream flowing through line 24 is passed through line 53, controlled by valve 54, as the absorbing medium, to the upper part of absorber 52. A cooler is positioned in line 53 to permit the cooling of the absorbing medium. Fixed gases substantially free of hydrogen chloride are eliminated from the system through valved line 55. The butane stream, comprising absorbed hydrogen chloride, is passed from the absorber 52 through valved line 56, into line 24; the recovered hydrogen chloride thus being returned through line 20 to accumulator 21. If desired, at least a part of the butane stream comprising absorbed HCl leaving absorber 52 may be combined, by means not shown in the drawing, with reaction products flowing to column 27, at a point beyond line 20. A valved line 57 is provided to permit the passage of gaseous material directly from line 51 into line 14, should this be desired.

The invention thus provides a process for the isomerization of hydrocarbons of substantially improved efficiency. This improved efficiency is attained not only by a reduction in operating cost obtained by the advantages comprising those specifically mentioned above, but as a result of other added advantages, such as extreme ease in maintaining optimum operating conditions in all phases of the process. These added advantages are attained, at least to a substantial degree, by the recycling of butanes from stripping column 27 to line 20. The resulting increase in the available liquid in accumulator 21 not only accomplishes the improvements described above, but permits the maintenance of a constant flow of material therefrom to the fractionating zone. This makes possible a continued uniform fractionation, independent of the fluctuations which generally arise in the rate at which products flow from the reaction zone. The increased amount of liquid in accumulator 21, furthermore, makes possible the use of this vessel as the storage means within the system for hydrogen chloride recovered from fixed gases and for the excess hydrogen chloride given off by stripping column 27.

The invention has been described in detail in its application to the vapor phase isomerization of butane. It is to be understood that the invention is in no wise limited to the isomerization of this particular hydrocarbon. Thus, by the inclusion in the charge of suitable agents such as, for example, hydrogen, isobutane, etc., capable of suppressing undesirable side reactions, the vapor phase process as described herein may be advantageously employed for the isomerization of higher saturated hydrocarbons such as the pentanes, hexanes, methyl cyclopentane, etc.

By substituting for the reactor 15 and the catalyst described above a reactor and catalyst enabling isomerization in the liquid phase, the process of the invention may be applied with advantage to the liquid phase isomerization of hydrocarbons, such as, for example, saturated hydrocarbons having from four to nine carbon atoms and comprising pentane, methyl cyclopentane, dimethyl cyclopentane, the hexanes, methyl cyclohexane, heptane and similar straight- or branched-chain paraffinic and naphthenic hydrocarbons. Any suitable liquid phase isomerization catalyst such as, for example, a molten salt mixture comprising a hydrogen halide may be used. The hydrocarbons treated in the process of the invention need not be pure individual compounds but may be a mixture of more than one hydrocarbon.

Although the invention can be applied with particular advantage to the isomerization of hydrocarbons, it is not intended to limit its scope to the execution of this particular hydrocarbon reaction. The invention may suitably be applied to the execution of a wide variety of catalytic hydrocarbon conversions, both in the liquid and vapor phase, wherein a normally gaseous promoter or a normally gaseous catalyst material, capable of being absorbed by, or dissolved in the charge, or a fraction of the products produced within the system is used. The invention can be applied with advantage, for example, to catalytic hydrocarbon conversions such as cracking, polymerization, alkylation, reversion, and the like, wherein catalysts such as those of the Friedel-Crafts type, or any other type, can be used in the presence of hydrogen halide promoters.

This application is a division of co-pending application, Serial No. 411,687, filed September 20 1941.

I claim as my invention:

1. In a process wherein butane is isomerized by passage in admixture with hydrogen chloride at isomerizing conditions through a reaction zone containing an isomerization catalyst, reaction products are passed through an accumulating zone to a fractionating zone, fixed gases comprising hydrogen chloride are eliminated from the accumulating zone, and a normally gaseous fraction comprising hydrogen chloride is separated from a liquid fraction comprising butane in the fractionating zone, the combination of steps which comprises recycling a part of said gaseous fraction to the reaction zone, combining the remainder of said gaseous fraction with the effluence from the reaction zone, bringing said fixed gases into intimate contact with an absorbing medium in an absorber thereby dissolving hydrogen chloride in said absorbing medium, passing a part of said liquid fraction to the absorber as the absorbing medium, combining the enriched absorbing medium with the effluence from the reaction zone, cooling the resulting mixed stream to a temperature sufficiently low to dissolve at least a substantial part of the hydrogen chloride present in the hydrocarbons, passing the cooled stream to the accumulating zone, and passing liquid comprising dissolved hydrogen chloride from the accumulating zone to the fractionating zone.

2. In a hydrocarbon conversion process wherein hydrocarbons are converted by passage in admixture with a hydrogen halide at conversion conditions through a catalyst-containing reaction zone, reaction products are passed through an accumulating zone to a fractionating zone, fixed gases comprising hydrogen halide are eliminated from the accumulating zone, and a normally gaseous fraction comprising hydrogen halide is separated from a liquid fraction comprising hydrocarbons in the fractionating zone, the combination of steps which comprises recycling a part of said gaseous fraction to the reaction zone, combining the remainder of said gaseous fraction with the effluence from the reaction zone, bringing said fixed gases into intimate contact with an absorbing medium in an absorber thereby dissolving hydrogen halide in said absorbing medium, passing a part of said liquid fraction to the absorber as the absorbing medium, combining the enriched absorbing medium with the effluence from the reaction zone, cooling the resulting mixed stream to a temperature sufficiently low to dissolve at least a substantial part of the hydrogen halide present in the hydrocarbons, passing the cooled stream to the accumulating zone, and passing liquid comprising dissolved hydrogen halide from the accumulating zone to the fractionating zone.

3. In a hydrocarbon conversion process wherein hydrocarbons are converted by passage in admixture with a hydrogen halide at conversion conditions through a catalyst-containing reaction zone, reaction products are passed through an accumulating zone to a fractionating zone, fixed gases comprising hydrogen halide are eliminated from the accumulating zone, and a normally gaseous fraction comprising hydrogen halide is separated from a liquid fraction comprising hydrocarbons in the fractionating zone, the combination of steps which comprises bringing said fixed gases into intimate contact with an absorbing medium in an absorber thereby dissolving hydrogen halide in said absorbing medium, passing a part of said liquid fraction to the absorber as the absorbing medium combining the enriched absorbing medium with the effluence from the reaction zone, cooling the resulting mixed stream to a temperature sufficiently low to dissolve at least a substantial part of the hydrogen halide present in the hydrocarbons, passing the cooled stream to the accumulating zone, and passing liquid comprising dissolved hydrogen halide from the accumulating zone to the fractionating zone.

4. In a hydrocarbon conversion process wherein hydrocarbons are converted by passage in admixture with a hydrogen halide at conversion conditions through a catalyst-containing reaction zone, reaction products are passed through an accumulating zone to a fractionating zone, fixed gases comprising hydrogen halide are eliminated from the accumulating zone, and a normally gaseous fraction comprising hydrogen halide is separated from a liquid fraction comprising hydrocarbons in the fractionating zone, the combination of steps which comprises bringing said fixed gases into intimate contact with an absorbing medium in an absorber thereby dissolving hydrogen halide in said absorbing medium, passing a part of said liquid fraction to the absorber as the absorbing medium, and combining the enriched absorbing medium with said reaction products passed to the fractionating zone.

5. In a hydrocarbon conversion process wherein hydrocarbons are converted by passage in admixture with a hydrogen halide at conversion conditions through a catalyst-containing reaction zone, reaction products are passed through an accumulating zone to a fractionating zone, fixed gases comprising hydrogen halide are eliminated from the accumulating zone, and a normally gaseous fraction comprising hydrogen halide is separated from a liquid fraction comprising hydrocarbons in the fractionating zone, the combination of steps which comprises recycling a part of said fixed gases comprising hydrogen halide from the accumulating zone to the reaction zone, bringing the remainder of said fixed gases into intimate contact with an absorbing medium in an absorber thereby dissolving hydrogen halide in said absorbing medium, passing a part of said liquid fraction to the absorber as the absorbing medium, and combining the enriched absorbing medium with the effluence from the reaction zone.

6. In a hydrocarbon conversion process wherein hydrocarbons are converted by passage in admixture with a hydrogen halide at conversion conditions through a catalyst-containing reaction zone, reaction products are passed to a fractionating zone, and a normally gaseous fraction comprising hydrogen halide is separated from a liquid fraction comprising hydrocarbons in the fractionating zone, the combination of steps which comprises recycling a part of said gaseous fraction to the reaction zone, combining the remainder of said gaseous fraction and a part of said liquid fraction with the effluence from the reaction zone, cooling the resulting mixed stream to a temperature sufficiently low to dissolve at least a substantial part of the hydrogen halide present in the hydrocarbons, passing the cooled stream to an accumulating zone, and passing liquid comprising dissolved hydrogen halide from the accumulating zone to the fractionating zone.

7. In a hydrocarbon conversion process wherein hydrocarbons are converted by passage in admixture with a hydrogen halide at conversion conditions through a catalyst-containing reaction zone, reaction products are passed to a fractionating zone, and a normally gaseous fraction comprising hydrogen halide is separated from a liquid fraction comprising hydrocarbons in the fractionating zone, the combination of steps which comprises recycling a part of said gaseous fraction to the reaction zone, combining the remainder of said gaseous fraction with the effluence from the reaction zone, cooling the resulting mixed stream to a temperature sufficiently low to dissolve at least a substantial part of the hydrogen halide present in the hydrocarbons, passing the cooled stream to an accumulating zone, and passing liquid comprising dissolved hydrogen halide from the accumulating zone to the fractionating zone.

8. In a hydrocarbon conversion process wherein hydrocarbons are converted by contact in the vapor phase in admixture with a hydrogen halide at conversion conditions with a catalyst in a catalyst-containing reaction zone, reaction products are passed to a fractionating zone, and a normally gaseous fraction comprising hydrogen halide is separated from a liquid fraction comprising hydrocarbons in the fractionating zone, the combination of steps which comprises first separating said reaction products from the catalyst prior to any substantial condensation thereof, cooling said separated reaction products to condense at least a substantial part of the hydrocarbon content thereof, combining a part of said liquid fraction from said fractionating zone with said cooled reaction products, further cooling the resulting mixed stream to a temperature sufficiently low to dissolve at least a substantial part of the hydrogen halide present in the reaction products in the hydrocarbons, passing the cooled mixed stream to an accumulating zone, separately withdrawing gases comprising hydrogen halide and liquid comprising hydrocarbons containing dissolved hydrogen halide from the accumulating zone, and passing said liquid from the accumulating zone to said fractionating zone.

9. In a process wherein saturated isomerizable hydrocarbons are isomerized by passage with hydrogen halide at isomerizing conditions through a reaction zone containing an isomerization catalyst, reaction products are passed through an accumulating zone to a fractionating zone, fixed gases comprising hydrogen halide are eliminated from the accumulating zone, and a normally gaseous fraction comprising hydrogen halide is separated from a liquid fraction comprising the hydrocarbon isomerizate in the fractionating zone, the combination of steps which comprises bringing said fixed gases into intimate contact with an absorbing medium in an absorber, thereby dissolving hydrogen chloride in said absorbing medium, passing a part of said liquid fraction comprising said hydrocarbon isomerizate to the absorber as the absorbing medium, combining the enriched absorbing medium with the effluence from the reaction zone, cooling the resulting mixed stream to a temperature sufficiently low to dissolve at least a substantial part of the hydrogen halide present in the hydrocarbons, passing the cooled stream to the accumulating zone, and passing liquid comprising dissolved hydrogen halide from the accumulating zone to the fractionating zone.

10. In a process wherein butane is isomerized by passage in admixture with hydrogen chloride at isomerizing conditions through a reaction zone containing an isomerization catalyst, isomerization products are passed through an accumulating zone to a fractionating zone, fixed gases comprising hydrogen chloride are eliminated from the accumulating zone and a normally gaseous fraction comprising hydrogen chloride is separated from a liquid fraction comprising isobutane and unreacted normal butane in the fractionating zone, the combination of steps which comprises bringing said fixed gases into intimate contact with an absorbing medium in an absorber, thereby dissolving hydrogen chloride in said absorbing medium, passing a part of said liquid fraction comprising said isobutane and unreacted normal butane to the absorber as the absorbing medium, and combining the enriched absorbing medium with the said reaction products passed to the fractionating zone.

11. In a process wherein saturated isomerizable hydrocarbons are isomerized by passage in admixture with a hydrogen halide at isomerizing conditions through a reaction zone containing an isomerization catalyst, isomerization products are passed through an accumulating zone to a fractionating zone, fixed gases comprising hydrogen halide are eliminated from the accumulating zone and a normally gaseous fraction comprising hydrogen halide is separated from a liquid fraction comprising the hydrocarbon isomerizate in the fractionating zone, the combination of steps which comprises bringing said fixed gases into intimate contact with an absorbing medium in an absorber, thereby dissolving hydrogen halide in said absorbing medium, passing a part of said liquid fraction comprising said hydrocarbon isomerizate to the absorber as the absorbing medium, and combining the enriched absorbing medium with said reaction products passed to the fractionating zone.

12. In a process wherein butane is isomerized by passage in admixture with hydrogen chloride at isomerizing conditions through a reaction zone containing an isomerization catalyst, isomerization products are passed through an accumulating zone to a fractionating zone, fixed gases comprising hydrogen chloride are eliminated from the accumulating zone and a normally gaseous fraction comprising hydrogen chloride is separated from a liquid fraction comprising isobutane and unreacted normal butane in the fractionating zone, the combination of steps which comprises bringing said fixed gases into intimate contact with an absorbing medium in an absorber, thereby dissolving hydrogen chloride in said absorbing medium, passing a part of said liquid fraction comprising said isobutane and unreacted normal butane to the absorber as the absorbing medium, and passing the enriched absorbing medium from the absorber to the fractionating zone.

13. In a process wherein saturated isomerizable hydrocarbons are isomerized by passage in admixture with a hydrogen halide at isomerizing conditions through a reaction zone containing an isomerization catalyst, isomerization products are passed through an accumulating zone to a fractionating zone, fixed gases comprising hydrogen halide are eliminated from the accumulating zone and a normally gaseous fraction comprising hydrogen halide is separated from a liquid fraction comprising the hydrocarbon isomerizate in the fractionating zone, the combination of steps which comprises bringing said fixed gases into intimate contact with an absorbing medium in an absorber, thereby dissolving hydrogen halide in said absorbing medium, passing a part of said liquad fraction comprising said hydrocarbon isomerizate to the absorber as the absorbing medium, and passing the enriched absorbing medium from the absorber to the fractionating zone.

WILLIAM P. GAGE.